United States Patent
Bennett

(10) Patent No.: US 6,170,033 B1
(45) Date of Patent: *Jan. 2, 2001

(54) FORWARDING CAUSES OF NON-MASKABLE INTERRUPTS TO THE INTERRUPT HANDLER

(75) Inventor: Joseph A. Bennett, Rancho Cordova, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/940,232

(22) Filed: Sep. 30, 1997

(51) Int. Cl.⁷ ...................................................... G06F 9/46
(52) U.S. Cl. ........................... 710/260; 710/262; 712/244
(58) Field of Search ..................... 395/733, 735, 395/182.21; 712/244; 364/200; 710/260, 262, 261, 269, 266; 714/23

(56) References Cited

U.S. PATENT DOCUMENTS

| | | | |
|---|---|---|---|
| 4,250,546 | * 2/1981 | Boney et al. ......................... | 364/200 |
| 5,307,482 | * 4/1994 | Bealkowskit et al. ................ | 395/575 |
| 5,349,667 | * 9/1994 | Kaneko ................................ | 395/725 |
| 5,432,943 | * 7/1995 | Mitsuishi ............................. | 395/725 |
| 5,471,620 | * 11/1995 | Shimizu et al. ...................... | 395/375 |
| 5,560,024 | * 9/1996 | Harper et al. ........................ | 395/750 |
| 5,600,785 | * 2/1997 | Potter .............................. | 395/182.21 |
| 5,699,482 | * 12/1997 | Adoul et al. ......................... | 395/2.28 |
| 5,790,870 | * 8/1998 | Hausauer et al. .................... | 395/733 |

\* cited by examiner

*Primary Examiner*—John A. Follansbee
*Assistant Examiner*—Tim T. Vo
(74) *Attorney, Agent, or Firm*—Blakely, Sokoloff, Taylor & Zafman LLP

(57) ABSTRACT

The present invention relates to a method and apparatus for directing causes of non-maskable interrupts. The apparatus determines whether a computer system is designed to handle an alternative interrupt such as a SCI interrupt. If the system is capable of handling alternative interrupts, forwarding circuitry forwards the causes of non-maskable interrupts to an alternative interrupt handler. If the system is not capable of handling alternative interrupts, the apparatus forwards the cause of non-maskable interrupts to a NMI handler.

14 Claims, 2 Drawing Sheets

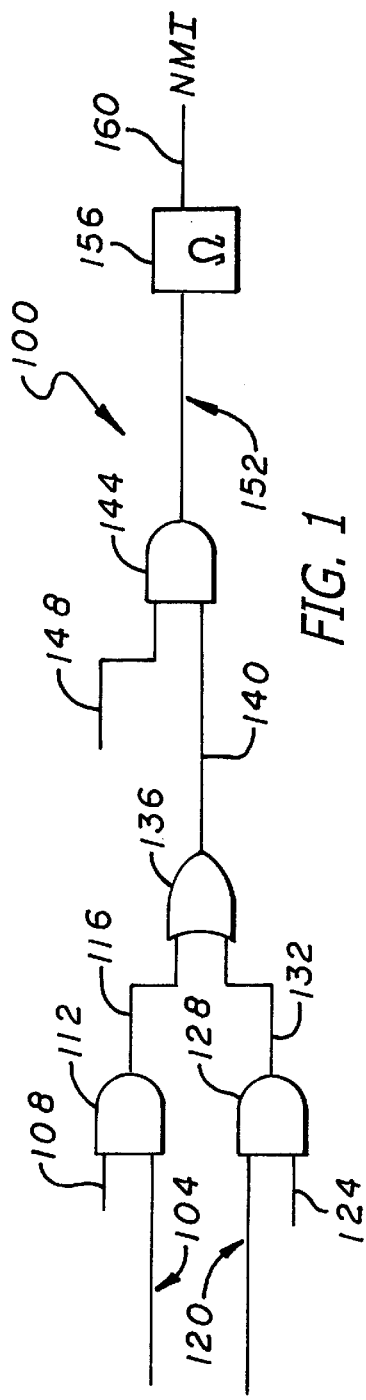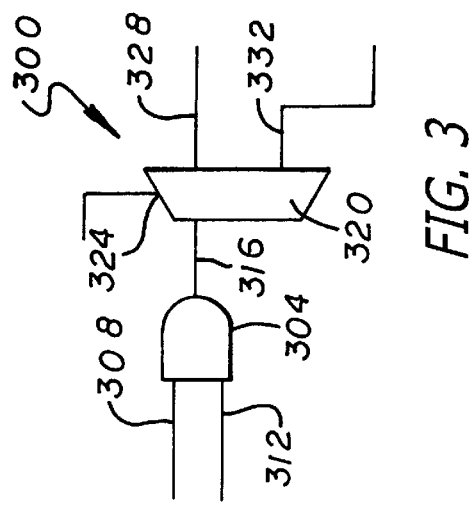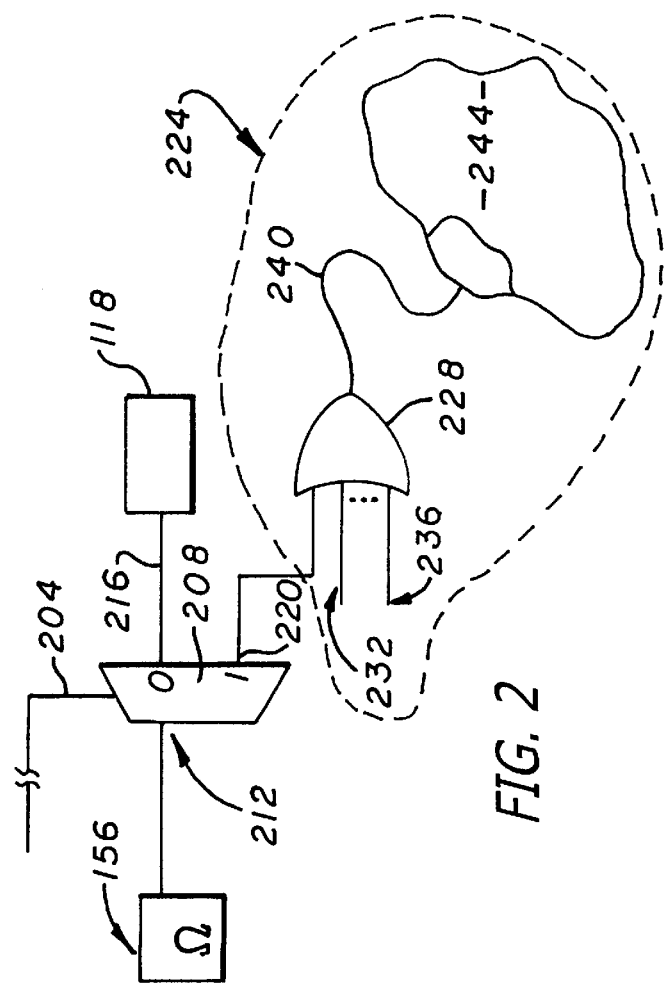

FORWARDING CAUSES OF NON-MASKABLE INTERRUPTS TO THE INTERRUPT HANDLER

BACKGROUND OF THE INVENTION

1. Field of the Invention

The present invention relates to handling interrupts. More particularly, the application relates to a method and apparatus to enable an interrupt handler to operate on errors that would normally be handled by a non-maskable interrupt (NMI) handler.

2. Description of Related Art

Processing circuits have traditionally generated non-maskable interrupts (NMI) and forwarded the NMI to a NMI handler. One event which results in a NMI is an input/output error (I/O check) which is asserted when a problem occurs on a parallel port transfer. The I/O check error is an Industry Standard Architecture (ISA) error. A second cause of NMIs is the assertion of a Peripheral Component Interface (PCI) system error, called "SERR#". One event which causes SERR# is typically a problem with error correcting code memory. Either an asserted SERR# or an asserted I/O check error may cause processing circuitry to generate a non-maskable interrupt error.

Processing circuits traditionally include a set of gates to combine causes of NMIs into one NMI signal line to a host CPU. In one embodiment of the prior art, the gates combine causes of NMIs with enables to generate a NMI signal. The interrupt signal is typically input into a latch. A clock signal times the output of the latch.

Current systems typically avoid asserting a non-maskable interrupt because of the disruptive nature of such interrupts. NMIs are not scheduled like most other interrupts, instead NMIs are handled immediately. The resulting disturbance in instruction flow has caused many operating system vendors to write operating systems which do not handle NMI interrupts. Instead, received NMIs cause a system reset which is disruptive to the system operation.

In order to avoid system resets which result when the NMI occurs, the causes of interrupts may be transmitted to a separate set of routing logic which generates a system management interrupt (SMI). The SMI is then subsequently transferred to BIOS. BIOS typically handles SMI without resetting the system.

However, asserting SMI is not without problems. An asserted SMI typically transfers control of the system to the BIOS resulting in disruption of operating systems functions. Thus, many operating systems do not handle SMI well because operating systems cannot schedule tasks during assertion of SMI.

Thus, a system is needed for generating alternative interrupts which indicate a NMI problem but are not as disruptive as the assertion of NMI. In the preferred embodiment, the system will utilize SCI (System Control Interrupt), a new interrupt introduced as part of the Advance Control Power Interface (ACPI). The ACPI is an open industry specification co-developed by Intel Corporation, Microsoft Corporation and Toshiba. A copy of the Advanced Configuration and Power Interface Specification, Revision 1.0 of Dec. 22, 1996 is available at internet web site www.teleport.com/~acpi/tech.htm#spec.

SUMMARY OF THE INVENTION

A system which forwards causes of non-maskable interrupts is described. The system includes a determining circuit to determine whether an interrupt handler can handle an alternative interrupt. An output of the determining circuit is output to a switch which forwards causes of NMI to a first line when the determining circuit determines that the interrupt handler can handle alternative interrupts. The switch forwards causes of NMI to a second line when the determining circuit determines that the interrupt handler cannot handle alternative interrupts.

BRIEF DESCRIPTION OF THE DRAWINGS

FIG. 1 shows a processing circuit for handling system errors and I/O check errors and outputting a cause of non-maskable interrupt signal.

FIG. 2 shows one embodiment of a routing system to forward a cause of non-maskable interrupt signal.

FIG. 3 shows a second embodiment of a routing system to forward a cause of non-maskable interrupt signal.

DETAILED DESCRIPTION OF THE INVENTION

Figure 4:
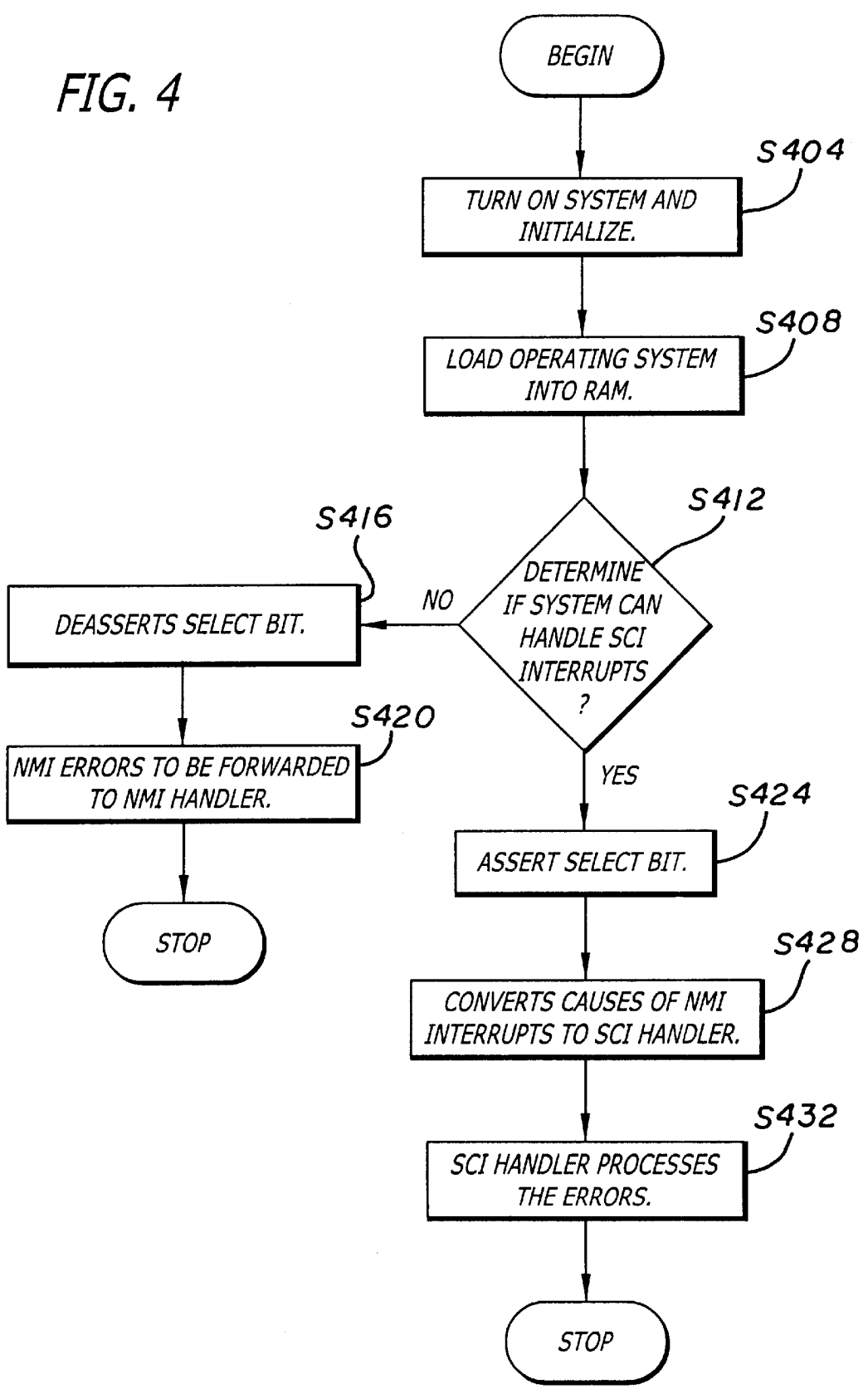
FIG. 4 shows a flow chart illustrating the steps for handling causes of NMIs in the present invention.

The following description describes a interrupt forwarding system which forwards error signals which cause non-maskable interrupts or "causes of non-maskable interrupts". The forwarding of causes of non-maskable interrupt to appropriate handling circuitry, removes the burden of forwarding from application software, BIOS and the end user.

In one embodiment of the invention, a determining circuit sets a select bit based on whether the operating system is capable of handling non-maskable interrupts. A criteria for determining whether a system can handle non-maskable interrupts may be whether an operating system is ACPI aware. In one embodiment of the invention, an operating system that is ACPI aware preferably receives system control interrupts (SCI) instead of NMIs when certain chosen errors occur.

When a non-ACPI operating system is installed, the determining circuit de-asserts the select bit resulting in the generation of a NMI when these chosen errors occur. Determination of whether the select bit should be asserted or de-asserted is typically under BIOS or operating system control. The select bit is transmitted to an integrated circuit chip which contains the interrupt handler. Such a chip may be a peripheral component interconnect (PCI) chip such as the PIIX4 chip from Intel Corporation of Santa Clara, California. In order to avoid tampering by virus software, the select bit may be set such that it can only be programmed through SMM space. Alternatively, the select bit may have a lockdown bit to prevent tampering by virus software.

The use of a select bit makes it possible to mask an originally non-maskable interrupt. In one embodiment of the invention, the setting of the select bit is determined on initialization or startup of the system when the operating system (O/S) is loaded into a random access memory of the computer. As the operating system is loaded, the boot-up or initialization routine of the BIOS determines whether the operating system is ACPI aware and appropriately sets the select bit. In an alternative embodiment, the operating system itself may alter the select bit during or after system initialization.

A processing circuit for handling SERR# and I/O check errors is shown in FIG. 1. The system 100 for handling the errors takes the input errors and generates a cause of non-maskable interrupt when certain gates are enabled. For example, SERR# signal 104 along with an enable signal on line 108 may be applied to the input terminals of an AND gate 112 to generate an SERR# output signal on line 116. I/O check error signal on line 120 may also be combined with an enable signal on line 124 in AND gate 128 to generate an I/O check output on line 132. A third OR gate 136 combines the output of the I/O check output on line 132 and the SERR# output signal on line 116 to generate a cause of NMI signal on line 140. Cause of NMI signal on line 140 is enabled when either SERR# and an enable signal on line 124 is asserted or when I/O check output line 132 and an enable signal on line 108 is asserted. The assertion of an input error such as SERR# or I/O check error 104, 120 along with a corresponding enable 108, 124 results in the output of an asserted cause of NMI signal on line 140. AND gate 144 combines the asserted cause of NMI signal on line 140 with a third enable line 148 to produce a final output 152.

Multiple enable gates 108, 124, 148, allows the BIOS or the operating system (OS) control to selectively disable individual interrupts. Careful control of when NMI is asserted is needed because of the disruptive nature of the NMI. A latch 156 controls the timing of the cause of NMI based on an appropriate clock signal. The final NMI signal is output on line 160.

FIG. 2 illustrates one method of implementing an interrupt handler to operate on errors that previously were handled by an NMI handler. In FIG. 2, a determining circuit (not shown) transmits a select bit on select line 204 to the select input of a demultiplexer 208. The determining circuit sets the select bit according to whether the system is capable of handling alternative interrupts. An alternative interrupt is an interrupt which can be substituted for a traditional NMI. One example of an alternative interrupt is the SCI interrupt.

The multiplexer 208 receives a "cause signal" indicating a cause of NMI error has been asserted at the demultiplexer input 212. In the embodiment shown in FIG. 2, the demultiplexer input 212 receives its cause signal from the latch 156. If the select bit input on select line 204 is not asserted, the demultiplexer 208 routes the cause signal to a NMI handler through demultiplexer output line 216 for processing by NMI handler 118. The NMI handler 118 operates on the cause signal by traditional methods as known by those of ordinary skill in the art.

When the determining circuit determines alternative interrupts are available, the determining circuit asserts the select bit input to the multiplexer 208 on line 204. The determining circuit determines whether alternative interrupts are available by checking the BIOS and the operating system. One example of a system capable of alternative interrupts is an ACPI aware system. Thus, when a system is ACPI aware, the select bit 204 is asserted and the demultiplexer 208 outputs the cause of NMI signal along output line 220 to electronics 224. In one embodiment of the invention, electronics 224 includes a multiple input OR gate 228 receiving the forwarded cause of NMI signal from line 220 of multiplexer 208. OR gate 228 also receives other power management events along lines 232 and 236. Power management events include timer roll-over and events which generate system control interrupts. When an event which results in an alternative interrupt such as a SCI interrupt occurs, OR gate 228 outputs the SCI interrupt on line 240. Routing circuitry 244 handles the SCI error 240 as defined by the ACPI specifications.

FIG. 3 illustrates a second implementation of the routing system of FIG. 2. In the interrupt handling system 300 of FIG. 3, AND gate 304 receives error signals on lines 308 and 312. Two examples of such error signals are the SERR# signal and I/O check error signal. When either an SERR# or I/O check error signal is not asserted, the output 316 of AND gate 304 is not asserted. The output 316 signal is input into multiplexer input 324. A select bit is transmitted to the select input 324 of multiplexer 320. The select bit determines whether the multiplexer forwards the causes of NMI to an NMI handler via a NMI output on line 328 or to an SCI handler via the SCI output line 332.

A number of modifications to the circuits shown in FIGS. 1, 2 and 3 may be made without changing the function of the invention. For example, the latching of the system by latch 156 may occur anywhere along the signal path. Placement of latch 156 as well as demultiplexer 208 may occur at various points along the signal path. The signal path is defined to include the route from the generation of the error that is input to AND gate 304, the circuitry between the AND gate 304 and multiplexer 320 and the circuitry from demultiplexer output 320 to interrupt handling circuitry which handles the causes of NMIs.

In a third embodiment of the invention, a three-line output demultiplexer may be used. Enable signals may be input into one of the select lines of the at least three-output demultiplexer such that when the system is not to be enabled, the multiplexer selects an unconnected line.

FIG. 4 is a flow chart showing the steps executed by the present invention. In step S404, a computer system is turned on and a proper initialization sequence started. The initialization may include loading an operating system from a disk into random access memory and setting up initial computer parameters. The initialization sequence also determines whether the operating system loaded into RAM in step S408 is capable of handling alternative interrupts such as a SCI interrupt in step S412. If the system cannot handle SCI interrupts, the select bit is de-asserted in step S416. De-assertion of the select bit in step S416 results in the cause of NMI signal being forwarded to the NMI handler in step S420.

When the BIOS or operating system determines that the operating system can handle SCI interrupts in step S412, the system may assert the select bit in step S424. Assertion of the select bit S424 causes future cause of NMI signals to be forwarded to the SCI handler in step S428. In step S432, the SCI handler processes the errors.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
   a first circuit to determine whether an interrupt handler can handle alternative interrupts, the first circuit to generate a select signal to indicate whether the interrupt handler can handle alternative interrupts, the select signal being set to a first value if the interrupt handler can handle alternative interrupts and set to a second value if the interrupt handler cannot handle alternative interrupts; and
   a second circuit to generate and forward to the interrupt handler an alternative interrupt corresponding to a cause of a non-maskable interrupt if the first circuit determines that the interrupt handler can handle alternative interrupts, the second circuit to forward the cause of the non-maskable interrupt to a non-maskable interrupt handler if the first circuit determines that the interrupt handler cannot handle alternative interrupts.

2. The system of claim 1 wherein the value of the select signal is set according to whether a processor is Advanced Control Power Interface (ACPI) aware.

3. The system of claim 1 wherein the second circuit comprises:

a switch coupled to receive the select signal from the first circuit, the switch to forward the cause of the non-maskable interrupt to the interrupt handler if the select signal is set to the first value and to forward the cause of the non-maskable interrupt to the non-maskable interrupt handler if the select signal is set to the second value.

4. The system of claim 1 further comprising:

a processing circuit to generate the cause of the non-maskable interrupt.

5. The system of claim 3 wherein the switch is a demultiplexer.

6. The system of claim 4 wherein the processing circuit generates the cause of the non-maskable interrupt based upon whether a Peripheral Component Interface (PCI) system error or an input/output (I/O) check error is asserted.

7. A method comprising:

determining whether an interrupt handler is capable of handling alternative interrupts;

generating a select signal to indicate whether the interrupt handler is capable of handling alternative interrupts, the select signal being set to a first value if the interrupt handler is capable of handling alternative interrupts and set to a second value if the interrupt handler is not capable of handling alternative interrupts;

if the interrupt handler is capable of handling alternative interrupts, generating and forwarding to the interrupt handler an alternative interrupt corresponding to a cause of a non-maskable interrupt; and if the interrupt handler is not capable of handling alternative interrupts, forwarding the cause of the non-maskable interrupt to a non-maskable interrupt handler.

8. The method of claim 7 wherein alternative interrupts comprise System Control Interrupts (SCI).

9. The method of claim 7 wherein determining whether the interrupt handler is capable of handling alternative interrupts composes:

determining whether a system is ACPI aware.

10. The method of claim 7 further comprising:

generating the cause of the non-maskable interrupt based upon a PCI system error and an I/O check error.

11. The method of claim 10 wherein the PCI system error and the I/O check error are combined to generate the cause of the non-maskable interrupt.

12. The method of claim 11 wherein the cause of the non-maskable interrupt is latched.

13. A circuit for forwarding causes of non-maskable interrupts comprising:

determination logic to determine whether an interrupt handler can handle an alternative interrupt in response to a non-maskable interrupt and to generate a select signal to indicate whether the interrupt handler can handle the alternative interrupt, the select signal being set to a first value if the interrupt handler can handle the alternative interrupt and set to a second value if the interrupt handler cannot handle the alternative interrupt;

processing logic to generate a cause of the non-maskable interrupt; and forward logic to forward the cause of the non-maskable interrupt to a non-maskable interrupt handler if the interrupt handler cannot handle the alternative interrupt, the forward logic to generate and forward the alternative interrupt to the interrupt handler if the interrupt handler can handle the alternative interrupt.

14. The circuit of claim 13 wherein the forward logic comprises:

switching logic to forward the cause of the non-maskable interrupt to the interrupt handler if the select signal is set to the first value and to forward the cause of the non-maskable interrupt to the non-maskable interrupt handler if the select signal is set to the second value.

* * * * *